United States Patent [19]

McEwan et al.

[11] 4,305,859

[45] Dec. 15, 1981

[54] TWO-STEP COPOLYMERIZATION PROCESS BY CONTROLLING THE TEMPERATURE TO PREPARE COPOLYMER LATEX CONTAINING HARD AND SOFT MONOMER COMPONENTS

[75] Inventors: Ian H. McEwan, Kleinburg; Manubhai B. Patel, Scarborough, both of Canada

[73] Assignee: Canadian Industries Limited, Montreal, Canada

[21] Appl. No.: 87,570

[22] Filed: Oct. 23, 1979

[30] Foreign Application Priority Data

Oct. 24, 1978 [GB] United Kingdom ............... 41770/78

[51] Int. Cl.³ .................. C08L 9/04; C08L 19/02; C08L 33/06; C08F 220/18
[52] U.S. Cl. .................. 260/29.6 TA; 260/29.4 UA; 260/29.6 R; 260/29.6 T; 260/29.6 Z; 260/29.6 H; 260/29.6 HN; 260/29.7 H; 260/29.7 T; 260/29.7 SQ; 260/29.7 NQ
[58] Field of Search .................. 260/29.6 TA, 29.6 R, 260/29.6 H, 29.6 HN, 34.2, 29.7 NQ, 29.7 H, 29.6 SQ, 29.7 T, 29.6 Z; 526/73

[56] References Cited

U.S. PATENT DOCUMENTS

| | | | |
|---|---|---|---|
| 2,978,432 | 4/1961 | Graulick et al. | 525/142 |
| 3,247,139 | 4/1966 | Christenson | 260/21 |
| 3,726,848 | 4/1973 | Squire et al. | 526/73 |
| 3,845,066 | 10/1974 | Vasta | 260/29.6 WB |
| 3,865,772 | 2/1975 | Hulyalkar | 260/29.7 H |
| 3,882,070 | 5/1975 | Ceska | 260/29.7 T |
| 3,970,628 | 7/1976 | Connelly et al. | 260/29.6 TA |
| 4,097,438 | 6/1978 | Christenson et al. | 260/29.6 TA |
| 4,125,696 | 11/1978 | Kamath | 526/73 |

*Primary Examiner*—Herbert J. Lilling
*Attorney, Agent, or Firm*—Cushman, Darby & Cushman

[57] ABSTRACT

Improved process for the preparation of aqueous emulsions of addition copolymers having functional groups to provide thermosetting capability via condensation. The process improvement resides in reducing the amount of unwanted premature condensation of the functional group. The process has two steps, one consisting of polymerizing a portion of the monomer reactants at a temperature not above 60° C. if the functional group is present and the other of continuing the polymerization with the addition of the remaining monomer reactants at a temperature not above 60° C. and at a pH in the range of from 1 to 7. The process is of use in producing improved thermosetting enamels.

8 Claims, No Drawings

TWO-STEP COPOLYMERIZATION PROCESS BY CONTROLLING THE TEMPERATURE TO PREPARE COPOLYMER LATEX CONTAINING HARD AND SOFT MONOMER COMPONENTS

This invention relates to an improved process for the preparation of thermosetting enamels based primarily on aqueous dispersion copolymers, and more particularly on latex copolymers.

Addition copolymers are known which are based on functional comonomers comprising a second functional group which provides thermosetting capability via condensation. Condensation is defined as the reaction between adjacent molecules or functional groups yielding a chemical bond between them with the release of a third molecule of very low molecular weight—typically water or a simple alcohol. It has been found, sometimes, that in conventional latex polymerization unwanted premature condensation of the functional comonomer occurs.

It has now been found that certain techniques under controlled conditions can be used to prevent premature condensation. This leads to improved end-use properties such as superior gloss and immersion resistance. The improved properties of the film formed from the latex may be due in part to a reduced degree of cross-linking in the latex. Cross-linking may arise when N-methylol derivatives are included in the copolymers. The N-methylol derivatives for example of urea, triazine (melamine) and benzoquanamine may be hydrolysed and cross-linked at elevated temperatures. In the case of a typical and very useful class of comonomers—the lower alkyl ethers of N-methylolacrylamide, such cross-linking is possible when the alkyl ether group is hydrolysed at elevated temperatures. It is known from U.S. Pat. No. 2,978,432 that premature cleavage and condensation of methylol ether groups may be avoided by carrying out the polymerization at low temperatures in neutral or weakly alkaline medium. It is also known that methylol ether groups are susceptible to acid hydrolysis.

Latex copolymerization reactions are generally carried out in single or several stages in acid solution and generally subjected to general acid catalysis at such elevated temperatures as to effect a reasonable rate of polymerization, but with the risk of unwanted premature condensation of the functional comonomer referred to hereinabove. Raising of the pH and/or a lowering of the polymerization temperature so as to avoid such unwanted hydrolysis would be expected to result in an unsatisfactory slow rate of polymerization.

Generally, the present invention provides a novel process for the preparation of a latex whereby the use of a combination of polymerization initiators results in some improved properties of the film formed from the latex. A particular improvement is noted when the latex is used as a can coating. The coating exhibits a substantial lack of "gushing" on storage of the can. "Gushing" is a phenomenon which results from product etching and is the foaming of beverage when older cans are opened. Product etching is the attack of beverage on the coating in those areas where relatively poor integration of the film occurs. This provides areas for nucleation of dissolved gases, which results in "gushing". The process of this invention may also be used in the production of latices which may be formulated into metal decorative coatings and automotive enamels.

According to the present invention there is provided an improved process for the preparation of an aqueous emulsion of a copolymer which copolymer comprises from 99 to 30 parts by weight of at least one main monomer selected from the group consisting of styrene, α-methyl styrene, acrylonitrile, alkyl acrylates, alkyl methacrylates, alkyl fumarates, alkyl maleates, wherein the alkyl radical includes radicals of 1 to 12 carbon atoms, vinyl esters and ethers of organic and inorganic acids, vinyl pyridine, chloro allyl carbamate, butadiene and ethylene, from 1 to 30 parts by weight of at least one functional monomer selected from N-methylol derivatives of the formula $$Y-NR_1-R_2$$

wherein $R_1$ is $R_2$ or H; $R_2$ is $CH_2OR_3$; $R_3$ is H or $C_1-C_4$ alkyl; and Y a 4-benzyl-6-amino triazinyl radical or a $R_4CO-$ radical wherein $R_4$ is $CH_2=CH-$, $CH_2=C(CH_3)-$, or $CH_2=CH-CH_2-$; from 0 to 25 parts by weight of an hydroxyl group-containing monomer; and from 0 to 15 parts by weight of an unsaturated aliphatic carboxylic acid wherein the aliphatic group includes radicals of $C_2$ to $C_6$, with the total parts by weight of monomers being 100, which process comprises carrying out the polymerization in aqueous medium, in two stages;

the first stage consisting of polymerizing a portion of the above monomers, which does not include the functional monomer when a polymerization temperature above 60° C. is used in the presence of a sufficient amount of an initiator selected from salts of persulphates and peroxyacids;

the second stage consisting of continuing the polymerization at a temperature not exceeding 60° C. and at a pH in the range of from 1 to 7, with the addition of the remaining portion of the monomers being made in the presence of an initiator redox system comprising a reducing agent and a peroxide component selected from hydrogen peroxide, ammonium persulphate, organic peroxides and hydro-peroxides, and alkyl percarbonates.

In the above formula $R_3$ is preferably a methyl or isobutyl radical.

In a preferred form the invention provides an improved process for the preparation of an aqueous emulsion of a copolymer which copolymer comprises from 99 to 30 parts by weight of at least one main monomer selected from the group consisting of styrene, α-methyl styrene, acrylonitrile, alkyl acrylates, alkyl methacrylates, alkyl fumarates, alkyl maleates, wherein the alkyl radical includes radicals of 1 to 12 carbon atoms, vinyl esters and ethers of organic and inorganic acids, vinyl pyridine, chloro allyl carbamate, butadiene and ethylene, from 1 to 30 parts by weight of at least one functional monomer selected from lower alkyl ethers of methylolacrylamide and methylolmethacrylamide wherein the alkyl radical includes radicals of 1-4 carbon atoms, from 0 to 25 parts by weight of an hydroxyl group-containing monomer, and from 0 to 15 parts by weight of an unsaturated aliphatic carboxylic acid, wherein the aliphatic group includes radicals of $C_2$ to $C_6$, with the total parts by weight of monomers being 100.

Preferably, the polymerization is carried out in the absence of substantially any alkali metal and alkaline earth metal ions.

The nature and proportions of monomers to be used in either stage may be chosen by those skilled in the art in regards the copolymer produced desired, with the proviso that there must be no functional monomer present when the polymerization temperature is greater than 60° C. and the pH is less than 7.

The process of the invention provides for a 2-stage process to enable a possible advantage to be taken of operating part of the process of the invention at a polymerization temperature greater than 60° C. However, the process also includes the situation wherein the first stage includes functional monomer and is conducted at a polymerization temperature of less than 60° C. and at a pH in the range 1–10, followed by the second stage at a pH restricted to <7.

Preferably when a functional monomer is present in a stage and the pH is in the range 1 to 5 the temperature of the medium is not greater than 45° C.; and when the temperature is in the range 45°–60° C. the pH is in the range 5 to 7.

The pH of the medium can be controlled by the addition of alkalizers and/or buffers which, preferably, are in the form of ammonium or water-soluble amine salts, e.g. acetates, carbonates, phosphates, hydroxides or acids such as hydrochloric acid, acetic acid and formic acid. Ammonia and water-free amines may also be used for this purpose.

Suitable initiator and initiator redox systems of use in the practice of the invention may be readily determined by those skilled in the art. The organic peroxides and hydroperoxides may be selected from tertiary-butyl hydroperoxide, cumene hydroperoxide, di-tertiary butyl peroxide, acetyl peroxide, benzoyl peroxide, lauroyl peroxide and 2,4-dichlorobenzoyl peroxide, as well as acetylcyclohexane sulphonyl peroxide.

The reducing agent is preferably selected from ammonium and water soluble amine salts of sulphites, bisulphites, pyrosulphites, dithionites, dithionates, thiosulphates and formaldehyde sulphoxylate. The reducing agent is preferably added as an aqueous solution having a pH range of from 9 to 9.7.

Heavy metal ions, such as iron, copper, nickel, cobalt, chrome, molybdenum, vanadium and cerium in the form of chlorides or sulphates may also be included as activators for the redox initiator system. Ferrous sulphate ($Fe_2SO_4 7H_2O$) or ferrous ammonium sulphate ($Fe(NH_4)_2 (SO_4)_2 \cdot 6H_2O$) are the most commonly used activators.

The initiator for the first polymerization stage is preferably employed in the amount of from 0.2 to 0.5% by weight based on the total weight of monomers in that stage.

The peroxide component of the redox initiator system is preferably present in the range of from 0.2 to 0.5% by weight based on the total weight of monomers in the second stage and the reducing agent component is preferably employed in equimolar quantities to the peroxide component.

The heavy metal ions are preferably present in the amount of 5 ppm to 20 ppm based on aqueous phase.

In a preferred form of invention, the initiator for the first stage of the polymerization is ammonium persulphate and the redox initiator system comprises t-butyl hydroperoxide and ammonium bisulphite.

The process of the invention may be carried out according to conventional addition polymerization techniques suitably modified to account for the temperature, pH, and monomer requirements as hereinbefore set forth. The following steps are generally practiced. To a reactor vessel are added water, optionally one or more surfactants optionally in water-soluble amine or ammonium salt form, and a persulphate or peroxyacid initiator catalyst. The vessel is heated to and maintained at temperatures in the range of from 30° C. to 95° C. depending on the catalyst system employed, while a mixture of monomers feed is added. When feed containing a functional monomer is added the temperature is maintained below 60° C. The reactor vessel contents are maintained at reaction temperature for a period of generally ½ to 1 hour and then cooled, if necessary, to a temperature below 60° C. The reaction medium at the end of this first stage is generally acidic.

For the second stage the reactor vessel is maintained at a temperature in the range of from 30°–60° C. and the pH is adjusted to a value of less than 7 selected on the basis as hereinbefore described. The remaining monomer feed, which generally includes the functional monomer, is added simultaneously with or before the reducing agent and peroxide component constituting the initiator redox system. The reaction mixture is then worked up in the usual manner. The resulting latices may be neutralized with base to pH's of 6 to 9 to give adequate application characteristics.

For some processes, the presence of a surface active agent is necessary, for example in order to ensure stability of the copolymer emulsions or in order to form copolymers of very small particle size, i.e. less than 0.5 μm or to prevent fouling of reactor surfaces. In such processes, the surface active agent is preferably in the form of a water soluble amine or ammonium salt. Any surface active agent which is known conventionally to give stable aqueous emulsions can be employed, when required in the process of this invention.

The quantity of the surfactant used in the process of the invention is the same quantity suggested as of use in aqueous emulsions polymerization processes, with the only guideline being that the minimum quantity which will give stability to the latex should be used.

As indicated previously the process of the present invention has proved most advantageous in the production of latex copolymers for use as interior can coating formulations. The copolymers are preferably thermosetting and comprise acrylic-type monomers including one or more monomers containing reactive groups such as acid, hydroxyl and substituted amide. The latices may optionally then be combined with from 0 to 30 parts by weight of a water-soluble or water-dispersible cross-linking agent such as melamine-formaldehyde, urea-formaldehyde, epoxy and phenolic resins.

The main monomers are preferably selected from combinations of hard and soft monomers; hard monomers being defined as forming homo-polymers with Tg ≧40° C. and soft monomers being defined as forming homopolymers with Tg <40° C. Tg is the glass transition temperature. The preferred soft monomers for the copolymer may be selected from the group consisting of butyl acrylate, butyl methacrylate, 2-ethyl hexyl acrylate and 2-ethyl hexyl methacrylate. The preferred hard monomers are styrene and methyl methacrylate.

Preferred polymerization ingredients and amounts for preparing the latex copolymers are as follows: from 1 to 30 parts by weight of at least one functional monomer selected from lower alkyl ethers of methylolacrylamide and methylolmethacrylamide, preferably isobutoxy and n-butoxy methylolacrylamide and isobutoxy and n-butoxy methylolmethacrylamide; from 0 to 25 parts by weight of at least one hydroxyl group containing monomer, preferably hydroxy-lower alkylmethacrylates or-acrylates; and more preferably hydroxypropyl and hydroxyethyl-methacrylates and -acrylates; from 0 to 15 parts by weight of at least one unsaturated aliphatic carboxylic acid, preferably acrylic acid and methacrylic acid; and at least one main monomer selected from 0 to 40 parts by weight of at least one hard monomer selected from methyl methacrylate, butyl methacrylate, and styrene; and from 40 to 80 parts by weight of a soft monomer selected from 2-ethyl hexyl acrylate, butyl acrylate, and ethyl acrylate.

As mentioned earlier the resulting latices are neutralized with base, to get adequate application characteristics, to pH's of 6 to 9. Preferably the latices are neutralized with water soluble amines or ammonia. In addition the formulations may contain water soluble organic solvents such as the alcohols, ketones and glycol ethers at levels of from 0 to 30% by weight of the volatile components.

The absence of surfactant from the polymerization process when using the above-mentioned ingredients has proved to be particularly advantageous in the preparation of latex copolymers for interior can coating formulations.

Thus to produce a latex for use in an automotive coating formulation, the improved process of this invention preferably comprises polymerizing from 97.5 to 60 parts by weight of one or more main monomers selected from styrene, methyl methacrylate and butyl acrylate, from 0.5 to 5 parts by weight of acrylic acid or methacrylic acid and from 1 to 15 parts by weight of at least one hydroxyl group containing monomer, preferably selected from hydroxy-lower alkyl-methacrylates and-acrylates, and more preferably selected from hydroxypropylmethacrylate and-acrylate and hydroxyethylmethacrylate and acrylate and from 1–15 parts by weight of at least one monomer selected from the lower alkyl ethers of methylolacrylamide and methylolmethacrylamide, preferably isobutoxymethylolacrylamide and isobutoxymethylolmethacrylamide.

More specifically, typical examples of the process of the invention may comprise polymerizing from 98.5 to 30 parts by weight of styrene and methyl methacrylate, from 0 to 50 parts by weight of butyl acrylate, from 1 to 15 parts by weight of isobutoxymethylolacrylamide from 0 to 15 parts by weight of methacrylic acid or from 0.5 to 5 parts by weight of acrylic acid.

To produce latices for example for metallic paint formulation, the process comprises polymerizing 10 parts by weight of styrene, 42 parts by weight of methyl methacrylate, 40 parts by weight of butyl acrylate, 5 parts by weight of isobutoxymethylolacrylamide and 3 parts by weight of methacrylic acid or acrylic acid. To produce latices for example for solid colour formulations, the process comprises polymerizing 42 parts by weight of styrene, 10 parts by weight of methyl methacrylate, 40 parts by weight of methyl methacrylate, 40 parts by weight of butyl acrylate, 5 parts by weight of isobutoxymethylolacrylamide and 3 parts by weight of methacrylic acid or acrylic acid. The resulting copolymers have reduced viscosities in the range of from 0.15 to 0.7 dl/g measured in dimethyl formamide at 0.5 g copolymer per 100 ml solvent.

The latex copolymers prepared according to the process of the present invention may be used in automotive paint formulations which include melamine-formaldehyde resins. Suitable resins of this type include conventional alkylated melamine-formaldehyde resins designed for water-based coatings having a ratio of —CH$_2$OR groups to —CH$_2$OH groups, where R is lower alkyl, of at least 5:1. The latter resins can be prepared by known techniques in which a lower alcohol such as methanol, ethanol, butanol, isobutanol, propanol, isopropanol or 2-butoxy-ethanol is reacted with a melamine-formaldehyde resin to provide pendant hydroxyl groups. Examples of commercially available resins of this type are "Cymel" 300, "Cymel" 301, "Cymel" 303 ("Cymel" is a trade mark). "Uformite" MM-83 (trade mark) and "Resinene" 740 (trade mark). In fact, any conventional alkylated, e.g. butylated, melamine-formaldehyde resin may be used provided it meets the requirements of aqueous solubility, compatibility or dispersibility in the final system. Usually the resin will comprise from 8 to 30 parts by weight per 100 parts by weight of the paint formulation.

There may also be included in such automotive paint formulations a dissolved compatible copolymer present in the range of from about 0 to about 45 parts by weight per 100 parts by weight of the formulations. The copolymer will usually by acrylic in nature and preferably has a reduced viscosity Rv of from about 0.10 to about 0.40 dl/g at 25° C. in dimethyl formamide at 0.5 g copolymer per 100 ml solvent.

The term "compatible" when used in relation to this dissolved copolymer indicates that the dissolved copolymer must be compatible with the latex copolymer and the melamine-formaldehyde resin both in the liquid composition and when baked out as a finish. In the liquid phase, compatibility means that the stability of the system is such that no phase separation occurs while in the baked finish, the pigmented baked film should not suffer loss of gloss.

The term "dissolved" or soluble indicates that the copolymer is dissolved or soluble (giving clear or slightly hazy solutions) in one or more mixtures of water and water-miscible organic solvents, usually the solvents in which it is prepared and which meet pollution regulations for compositions and level.

The invention is illustrated by the following Examples which are not to be regarded as limiting the invention in any way. All parts, percentages and ratios are by weight unless otherwise indicated.

EXAMPLE 1

Preparation of a copolymer for can coating comprising methyl methacrylate/styrene/butyl acrylate/methacrylic acid/isobutoxymethylolacrylamide in the respective parts by weight of 9.5/19.0/57/9.5/5.0.

| | Stage 1 | | |
|---|---|---|---|
| | | Quantity | |
| Charge | Ingredients | Grams | % |
| A | Deionized water | 3828.00 | 37.62 |
| | Ammonium persulphate | 6.03 | 00.06 |
| B | Deionized water | 139.20 | 1.37 |
| | Ammonium persulphate | 3.60 | 0.04 |
| C | Methyl methacrylate | 174.00 | 1.71 |
| | Styrene | 348.00 | 3.42 |
| | Butyl acrylate | 1044.00 | 10.26 |
| | Methacrylic acid | 348.00 | 3.42 |
| D | Deionized water | 246.50 | 2.42 |
| | Ammonium hydroxide (28% ammonia) | 24.50 ml. | 0.24 |

Method

Charge A was added to a reactor vessel heated to 85° C. Charge B was then added simultaneously with Charge C over a 2 hour period. At the end of monomer addition, the whole was held for a further 30 minutes to ensure complete conversion, particularly of the methacrylic acid. The final Charge D was added over 15 minutes and at the same time, the reaction flask was cooled to 55°–60° C. The pH of the reaction medium at the end of this polymerization stage was 5.3 to 5.4.

Stage 2

| Charge | Ingredients | Quantity Grams | % |
|---|---|---|---|
| E | Methyl methacrylate | 174.00 | 1.71 |
|   | Styrene | 348.00 | 3.42 |
|   | Butyl acrylate | 1044.00 | 10.26 |
|   | Isobutoxymethylolacrylamide (must be haze-free) | 182.70 | 1.80 |
|   | Butyl "Cellosolve" (Trade Mark for glycol ethyl ethers) | 107.30 | 1.05 |
|   | Tertiary-butyl hydroperoxide (70%) | 6.23 | 0.061 |
| F | Deionized water | 139.20 | 1.37 |
|   | Ammonium bisulphite (47% solution, fresh) | 9.86 | 0.096 |
|   | Ammonium hydroxide (28% ammonia) | 13.00 ml. | 0.0127 |
| G. | Deionized water | 812.00 | 7.98 |
|   | Ammonium hydroxide (28% ammonia) | 32.00 ml. | 0.31 |
| H. | Deionized water | 130.50 | 1.28 |
|   | Butyl "Cellosolve" | 1009.20 | 9.92 |
|   |   | 10169.82 | 99.829 |

Method

The reactor vessel was maintained at a temperature in the range of from 55°–60° C. and Charge E was added to the vessel over a 2 hour period. The pH of Charge F was adjusted so that it was in the range of from 9.0 to 9.76 and the charge was added simultaneously with Charge E. Charge G was then added over a further 30 minutes to the reactor vessel and subsequently the vessel ingredients were cooled to 50° C. The pH of the whole after the addition of Charge G was in the range of from 6.4 to 6.71. Charge H was added over a further period of 15 minutes, at which time the polymerization was complete. This gave a blue-white latex of 36% by weight solids, of reduced viscosity, Rv=0.52 dl/g measured at 25° C., 0.5% solution in dimethyl formamide containing 1% lithium chloride. The copolymer dissolved completely in acetone and dimethyl formamide with viscosity 15 seconds in No. 4 Ford Cup at 25° C. The latex was applied to untreated aluminium panels at an application rate of 12 mg/4 sq. in. dry film weight. The coated panels were baked at 400° F. for 2 minutes and then tested for flush resistance in boiling water for 10 minutes. The film exhibited no sign of haze or blush and gave excellent crosshatch adhesion and no failure on 180° blend.

It should be noted that in this method, at the end of the monomer feed, an extra 32% redox catalyst may be added in order to ensure complete conversion of the monomers, i.e. at least 96%.

EXAMPLE 2

Preparation of a copolymer for automotive coating comprising methyl methacrylate/styrene/butyl acrylate/methacrylic acid/isobutoxymethylolacrylamide in the respective parts by weight of 57/10/25/3/5.

Stage 1

| Charge | Ingredients | Quantity Grams |
|---|---|---|
| A | Deionized water | 1350 |
| B | Deionized water | 14 |
|   | (NH$_4$)$_2$S$_2$O$_8$ | 1.62 |
|   | Monomer Mix (portion of Charge C) | 20 |
| C | Methyl methacrylate | 616 |
|   | Styrene | 108 |
|   | Butyl acrylate | 270 |
|   | Methacrylic acid | 40 |
|   | Octanethiol | 4.0 ml |
|   | Dimethylethanolamine | 3.3 ml |
| D | (NH$_4$)$_2$S$_2$O$_8$ | 1.6 |
|   | Deionized water | 200 |

Method

Charge A was placed in a reactor vessel and heated to 85° C. at which time Charge B was added. The vessel contents were held at this temperature for 15 minutes and then the remainder of pre-emulsified Charge C and Charge D were added simultaneously over 3½–4 hours. The vessel was held for a further 30 minutes at this temperature and then its contents were cooled to 55°–60° C.

Stage 2

| Charge | Ingredients | Quantity Grams |
|---|---|---|
| E | Methyl methacrylate | 154 |
|   | Styrene | 27 |
|   | Butyl acrylate | 68 |
|   | Isobutoxymethylolacrylamide | 68 |
|   | Tertiary-butyl hydroperoxide | 0.63 |
| F | Ammonium bisulphite solution (47% solution, fresh) | 1.47 |
|   | Water | 100 |
|   | Dimethylethanolamine | 1.4 ml. |

Method

Charges E and F were added simultaneously to the vessel while the contents were held at 55°–60° C. This addition took place over one hour, after which the contents were held for a further one half hour. The resulting latex had a pH 6.83, 44.42% total solids, 98.71% conversion and a reduced viscosity, Rv of 0.4 dl/g measured at 25° C., 0.5 g copolymer/100 ml dimethylformamide.

EXAMPLE 3

Preparation of a copolymer for automotive coating comprising methyl methacrylate/styrene/butyl acrylate/methacrylic acid/isobutoxymethylolacrylamide in the respective parts by weight of 57/10/25/3/5, and further comprising a surfactant.

Stage 1

| Charge | Ingredients | Quantity Grams |
|---|---|---|
| A | Deionized | 570 |
|   | Surfactant Solution 7.5% (see below) | 200 |
| B | (NH$_4$)$_2$S$_2$O$_8$ | 1.62 |
|   | Monomer mix (Portion of Charge C) | 20 |
|   | Deionized water | 14 |
| C | Methyl methacrylate | 616 |
|   | Styrene | 108 |
|   | Butyl acrylate | 270 |
|   | Methacrylic Acid | 40.5 |
|   | Octanethiol | 4.0 |
|   | Dimethylethanolamine | 3.0 ml |
| D | Surfactant Solution, 7.5% | 551 |
|   | (NH$_4$)$_2$S$_2$O$_8$ | 1.62 |

Method

Charge A was placed in a reactor vessel and heated to 85° C. On reaching this temperature Charge B was added to the vessel. The ingredients of the vessel were held at 85° C. for a further 15 minutes, upon which simultaneous addition of the remaining portion of pre-emulsified Charge C and Charge D was commenced, the addition rate being 440 ml/hr. The ingredients were held for a further one-half hour at 85° C. and immediately thereafter cooled to 55°-60° C.

Surfactant Solution

| | |
|---|---|
| "Aerosol" A-196 (Trade Mark) | 12 g. |
| "Siponate" DS-10 (Trade Mark) | 24 g. |
| Water | 2406 g. |
| Total | 2442 g. |

The above ingredients were mixed and treated with 1000 grams of "Dowex" 50 WX 8 (Trade Mark) acidic form, ion exchange resin beads to remove the sodium ions. The beads were filtered off and the solution was titrated with sufficient dimethylethanolamine to give it a pH of 8, thereby forming the amine salt of the surfactant blend. To ensure the complete removal of sodium ions, the acid number of the surfactant solution was measured and found to be in the range of from 146-152. Acid number may be defined as the number of milligrams of potassium hydroxide needed to neutralize 1.0 gm sample.

Stage 2

| Charge | Ingredients | Quantity Grams |
|---|---|---|
| A | Methyl methacrylate | 154 |
|   | Styrene | 27 |
|   | Butyl (trade mark) | 67.5 |
|   | Isobutoxymethylolacrylamide | 67.5 |
|   | Octanethiol | 1.5 |
|   | Tertiary-butyl hydroperoxide | 0.63 |
| B | Surfactant Solution, 7.5% | 200 |
| C | Ammonium bisulphite (47% solution, fresh) | 1.47 |
|   | Deionized water | 100 |
|   | Dimethylethanolamine | 1.4 ml |

Method

Charges A, B and C were added simultaneously to the reactor vessel while the contents were maintained at a temperature of 55°-60° C. When these additions were complete, the vessel contents were held for a further half hour at the same temperature whereafter the resulting latex was filtered through a 10μ bag. The latex was found to have a pH of 6.25, 44.55% solids and a reduced viscosity measured at 25° C., 0.5 g copolymer per 100 ml dimethylformamide of 0.2839 at 92% conversion.

EXAMPLE 4

In this example an automotive enamel is prepared incorporating the latex of Example 3.

Preparation of Millbase

| | Quantity | |
|---|---|---|
| Ingredients | Grams | % |
| Titanium dioxide ("Tipure" R960, trade mark) | 3000 | 63.40 |
| Deionized water | 1000 | 21.13 |
| Dimethylethanolamine | 17 | 0.36 |

The above ingredients were ground for fifteen minutes on a Cowles blade and the following premix was slowly added thereto.

| | | |
|---|---|---|
| Butyl "Cellosolve" | 202 | 4.27 |
| "Cymel" 301 | 1315 | 2.85 |
| Solution Copolymer* | 378 | 7.99 |
| (40% total solids) | 4732 | 100.00 |

The millbase was passed once through a sand mill.

*Preparation of Solution Copolymer

A water-soluble acrylic copolymer of the composition methyl methacrylate/butyl acrylate/hydroxypropyl methacrylate/acrylic acid in the respective parts by weight of 20.5/61.6/15.4/2.5 was prepared as follows:

| | | Quantity | |
|---|---|---|---|
| Charge | Ingredients | Grams | % |
| A | Isopropyl alcohol | 491 | 11.98 |
|   | Butyl "Cellosolve" | 149 | 3.64 |
| B | Methyl methacrylate | 308 | 7.52 |
|   | Butyl acrylate | 924 | 22.55 |
|   | Hydroxyproply-methacrylate | 231 | 5.64 |
|   | Acrylic acid | 38 | 0.93 |
|   | Azobisisobutyronitrile | 8 | 0.2 |
| C | Butyl "Cellosolve" | 400 | 9.76 |
| D | Dimethylethanolamine | 48 | 1.17 |
|   | Deionized water(warm) | 1500 | 36.61 |
|   |   | 4097 | 100.00 |

Method

Charge A was placed in a reactor vessel and heated to reflux. Charge B was then added to the vessel over a period of two hours. Reflux was continued for a further three hours and then Charge C was added. Isopropanol was distilled off, distillation being stopped when the temperature reached 148° C. The vessel contents were then cooled to 100° C. Charge D was then added. The copolymer had an Rv of 0.1986 dl/g measured at 25° C., 0.5 g copolymer per 100 ml dimethylformamide and total solids content of 40%.

Preparation of Water-borne enamel

An enamel of the following composition was prepared:

| Ingredients | Quantity grams |
| --- | --- |
| Latex copolymer (Example 3) | 263 |
| Triethanolamine (30% solution) | 1.3 ml |
| Millbase | 139 |
| "Cymel" 301 | 15 |
| Water soluble acrylic copolymer | 47 |
| Butyl "Cellosolve" | 28 |
| Normal-butanol | 5 |

The above enamel was sprayed onto untreated panels. The pre-bake temperature was 180° F. for 30 minutes, and the final bake temperature was varied as set out below. Gloss results for each bake were measured.

| Bake Temperature °F. for 30 minutes | Gloss |
| --- | --- |
| 255 | 73 |
| 270 | 68 |
| 285 | 63 |

EXAMPLE 5

(a) A water-borne automotive enamel of the following composition was prepared as described in Example 4.

| Ingredients | Quantity grams |
| --- | --- |
| Latex copolymer (Example 2) | 409.6 |
| Triethanolamine (30% solution) | 2.0 |
| Millbase (Example 4) | 154.8 |
| Blue Millbase (see below) | 19.0 |
| "Cymel" 301 | 23.7 |
| Solution Copolymer (Example 4) | 78.6 |
| Butyl "Cellosolve" | 39.2 |
| Normal-butanol | 6.0 |
| Total | 732.9 |

Preparation of Blue Millbase

| Ingredients | Parts |
| --- | --- |
| "Cinquasia Blue" RF BT 427-D (trade mark) | 10 |
| "Cymel" 301 | 10 |
| Deionized water | 39.9 |
| Butyl "Cellosolve" | 39.9 |
| Triethanolamine (100%) | 0.2 |

The above was ground by passing it twice through a sand mill to off-scale fineness.

(b) A second water-borne automotive enamel of the following composition was prepared as described in Example 4.

| Ingredients | Quantity grams |
| --- | --- |
| Latex copolymer (Example 2) | 416.9 |
| Triethanolamine (30% solution) | 0.7 |
| Millbase (Example 4) | 154.8 |
| Blue Millbase (see (a) above) | 19.0 |
| "Cymel" 301 | 23.7 |
| Solution copolymer (Example 4) | 78.6 |
| Butyl "Cellosolve" | 41.2 |
| Normal-butanol | 6.0 |
| Total: | 740.9 |

The above enamels were subjected to the Cleveland Condensing Humidity Test (QCT).

Description of QCT

This method tests the ability of a coating to withstand constant condensing humidity without change at elevated temperatures for 24 hours. The test consists of placing coated panels on a cabinet for 24 hours with a vapor temperature at 140° F. The finishes are rated for gloss, with special note being taken of blistering and distortion.

The above enamels were applied to untreated panels. The panels were pre-baked at 180° F. for 30 minutes and then at the temperatures 250°, 265°, 280°, 290°, 300°, 310° and 320° F. for 30 minutes, a set of panels for each enamel being readied. Each of the panels was then subjected to QCT with the best result being the best retention of gloss at the lowest bake temperature. The significance of such a result is the indication of a commercially useful enamel.

| Bake Temperature | Gloss | |
| --- | --- | --- |
| °F. | before | after |
| *Enamel (a)* | | |
| 250 | 77 | 5 |
| 265 | 77 | 20 |
| 280 | 75 | 66 |
| 290 | 77 | 74 |
| 300 | 71 | 72 |
| 310 | 67 | 74 |
| 320 | 70 | 75 |
| *Enamel (b)* | | |
| 250 | 75 | 6 |
| 265 | 76 | 56 |
| 280 | 73 | 55 |
| 290 | 73 | 58 |
| 300 | 72 | 68 |
| 310 | 70 | 68 |
| 320 | 69 | 67 |

EXAMPLE 6

Preparation of a copolymer for can-coating comprising methyl methacrylate/styrene/ethyl acrylate/methacrylic acid/isobutoxymethylolacrylamide in the ratio 9.5/9.0/57/9.5/5.0.

| Stage 1 | | | |
| --- | --- | --- | --- |
| | | Quantity | |
| Charge | Ingredients | grams | % |
| A | Deionised water | 3828 | 37.9 |
| | Ammonium persulphate | 6.08 | 0.06 |
| B | Deionised water | 139 | 1.30 |
| | Ammonium persulphate | 3.6 | 0.04 |
| C | Methyl methacrylate | 174 | 1.72 |
| | Styrene | 348 | 3.45 |
| | Ethyl acrylate (0.1% MEHQ)* | 1044 | 10.34 |
| | Methacrylic acid | 348 | 3.45 |

*MEHQ - methyl ether of hydroquinone (stabilizer)

Method

Charge A was placed in a reactor vessel and heated to 85° C. at which time charges B and C were added simultaneously over a period of 2 hours. The contents were held for 30 minutes at this temperature and cooled to 38°-40° C. The contents had pH 2.3-2.4.

Stage 2

| Charge | Ingredients | Quantity grams | % |
|---|---|---|---|
| D | Hydrogen peroxide (HP) (50%) | 35.0 | 0.35 |
|  | Deionised water | 100 | 0.99 |
|  | Isobutoxymethylolacrylamide | 3.5 | 0.03 |
|  | Tertiary-butyl hydroperoxide (70%) | 2.0 | 0.02 |
| E | Methyl methacrylate | 174 | 1.72 |
|  | Styrene | 348 | 3.45 |
|  | Ethyl acrylate | 1044 | 10.34 |
|  | Isobutoxymethylolacrylamide | 183 | 1.81 |
|  | Butyl Cellosolve | 107 | 1.06 |
| F | Deionised water | 100 | 0.99 |
|  | Ammonium thiosulphate | 2.62 | 0.03 |
| G | Deionised water | 50.0 | 0.50 |
|  | Hydrogen peroxide HP 50% | 4.0 | 0.04 |
| H | Deionised water | 50.0 | 0.50 |
|  | Ammonium thiosulphate | 0.3 | 0.003 |
| I | Deionised water | 840 | 8.32 |
|  | Ammonium hydroxide (28%) | 25 | 0.25 |
| J | Deionised water | 131.0 | 1.30 |
|  | Butyl Cellosolve | 1009 | 9.99 |

Method

Charge D was added to the reaction flask, and then Charges E and F were added simultaneously over 2 hours for Charge E and over 20 minutes for Charge F. After the addition, the contents were held for 30 minutes and then Charge G followed by Charge H added. The contents were held for a further 1 hour and then neutralized by the addition of Charge I over 30 minutes. The contents were finally cooled to 30° C. and then Charge J added over 15 minutes.

The resulting latex had a pH 6.51, 35.66% Total Solids, and a reduced viscosity, Rv, of 0.54 dl/g (1st stage), and 1.89 dl/g (2nd stage).

EXAMPLE 7

Preparation of a copolymer for can-coating comprising styrene/ethyl acrylate/methacrylic acid/isobutoxymethylolacrylamide in the ratio 15/70.5/9.5/5.

Stage 1

| Charge | Ingredients | Quantity grams | % |
|---|---|---|---|
| A | Deionised water | 4328 | 40.63 |
|  | Ammonium persulphate | 6.08 | 0.06 |
| B | Deionised water | 139.0 | 1.30 |
|  | Ammonium persulphate | 3.6 | 0.03 |
| C | Styrene | 275 | 2.58 |
|  | Ethyl acrylate (0.1% MEHQ*) | 1291 | 12.12 |
|  | Methylacrylic acid | 300 | 2.82 |

*MEHQ - methyl ether of hydroquinone (stabilizer)

Method

Charge A was placed in a reactor vessel and heated to 85° C. at which time Charges B and C were added simultaneously over a period of 2 hours. The contents were held for 30 minutes at this temperature and cooled to 38°–40° C. The contents had pH 2.3–2.4.

Stage 2

| Charge | Ingredients | Quantity grams | % |
|---|---|---|---|
| D | Hydrogen peroxide (HP) (50%) | 35 | 0.33 |
|  | Deionized water | 160 | 1.50 |
|  | Isobutyoxymethylolacrylamide | 3.0 | 0.03 |
| E | Methacrylic acid | 48 | 0.45 |
|  | Styrene | 275 | 3.58 |
|  | Ethyl acrylate | 1291 | 12.12 |
|  | Isobutoxymethylolacrylamide | 183 | 1.72 |
|  | Butyl Cellosolve | 107 | 1.00 |
| F | Deionized water | 100 | 0.94 |
|  | Ammonium thiosulphate | 2.6 | 0.02 |
| G | Deionised water | 50 | 0.47 |
|  | Hydrogen peroxide HP 50% | 4.0 | 0.04 |
| H | Deionised water | 50 | 0.47 |
|  | Ammonium thiosulphate | 0.3 | 0.003 |
| I | Deionised water | 840 | 7.89 |
|  | Ammonium hydroxide (28%) | 20 | 0.19 |
| J | Deionised water | 131 | 1.23 |
|  | Butyl Cellosolve | 1009 | 9.47 |

Method

Charge D was added to the reaction flask, and then Charges E and F were added simultaneously over 2 hours for Charge E and over 20 minutes for Charge F. After the addition, the contents were held for 30 minutes and then Charge G followed by Charge H added. The contents were held for a further 1 hour and then neutralized by the addition of Charge I over 30 minutes. The contents were finally cooled to 30° C. and then Charge J added over 15 minutes.

The resulting latex had a reduced viscosity, Rv, of 0.63 dl/g (1st stage), and 1.93 dl/g (2nd stage).

The coatings of Examples 6 and 7 give excellent blush resistance. No. 7 gives better adhesion (cross hatch) after immersion and is free from mud cracking after spray application.

We claim:

1. An improved process for the preparation of an aqueous emulsion of a copolymer which copolymer comprises from 99 to 30 parts by weight of at least one main monomer selected from the group consisting of styrene, α-methyl styrene, acrylonitrile, alkyl acrylates, alkyl methacrylates, alkyl fumarates, alkyl maleates, wherein the alkyl radical includes radicals of 1 to 12 carbon atoms, vinyl esters and ethers of organic and inorganic acids, vinyl pyridine, chloro allyl carbamate, butadiene and ethylene, from 1 to 30 parts by weight of at least one functional monomer selected from N-methylol derivatives of the formula

$$Y-NR_1-R_2$$

wherein $R_1$ is $R_2$ or H; $R_2$ is $CH_2OR_3$; $R_3$ is H or $C_1$–$C_4$ alkyl; and Y a 4-benzyl-6-amino triazinyl radical or a $R_4$CO— radical wherein $R_4$ is $CH_2$=CH—, $CH_2$=C($CH_3$)—, or $CH_2$=CH—$CH_2$—; from 0 to 25 parts by weight of an hydroxyl group-containing monomer; and from 0 to 15 parts by weight of an unsaturated aliphatic carboxylic acid wherein the aliphatic group includes radicals of $C_2$ to $C_6$, with the total parts by weight of monomers being 100, which process comprises carrying out the polymerization in aqueous medium, in two stages;

the first stage consisting of polymerizing a portion of the above monomers, which does not include the functional monomer when a polymerization temperature above 60° C. is used in the presence of a sufficient amount of an initiator selected from salts of persulphates and peroxyacids;

the second stage consisting of continuing the polymerization at a temperature not exceeding 60° C. and at a pH in the range of from 1 to 7, with the addition of the remaining portion of the monomers being made in the presence of an initiator redox system comprising a reducing agent and a peroxide component selected from hydrogen peroxide, ammonium persulphate, organic peroxides and hydroperoxides, and alkyl percarbonates.

2. The process as claimed in claim 1 wherein the N-methylol derivative is selected from the lower alkyl ethers of methylolacrylamide and methylolmethacrylamide wherein the alkyl radical includes radicals of 1 to 4 carbon atoms.

3. The process as claimed in claim 1 or 2 wherein the temperature of the second stage is not greater than 45° C. when the pH is in the range 1 to 5.

4. The process as claimed in claim 1 or 2 wherein the temperature of the second stage is in the range 45°–60° C. when the pH is in the range 5 to 7.

5. Process as claimed in claim 1 or claim 2 wherein the reducing agent is selected from ammonium and water soluble amine salts of sulphites, bi-sulphites, pyrosulphites, dithionites, dithionates, thiosulphates and formaldehyde sulphoxylate.

6. Process as claimed in claim 1 or claim 2 wherein the polymerization is carried out in the absence of substantially any alkali metal and alkaline earth metal ions.

7. Process as claimed in claim 1 or claim 2 wherein the polymerization is carried out in the presence of a surface active agent.

8. The process as claimed in claim 1 or claim 2 wherein the main monomer is selected from 0 to 40 parts by weight of at least one hard monomer selected from methyl and butyl methacrylate, and styrene and from 40 to 80 parts by weight of a soft monomer selected from 2-ethyl hexylacrylate, butyl acrylate and ethyl acrylate; wherein the functional monomer is at least one monomer selected from isobutoxymethylolacrylamide, n-butoxymethylolacrylamide, n-butoxymethylolmethacrylamide, and isobutoxy methylolmethacrylamide; wherein the hydroxyl group containing monomer is at least one monomer selected from hydroxy-propyl- and hydroxyethyl- methacrylates and -acrylates; and wherein the unsaturated aliphatic carboxylic acid is at least one acid selected from acrylic acid and methacrylic acid.

* * * * *